July 2, 1940.    W. H. ROWAND ET AL    2,206,336
STEAM BOILER
Filed Nov. 26, 1937    8 Sheets-Sheet 3
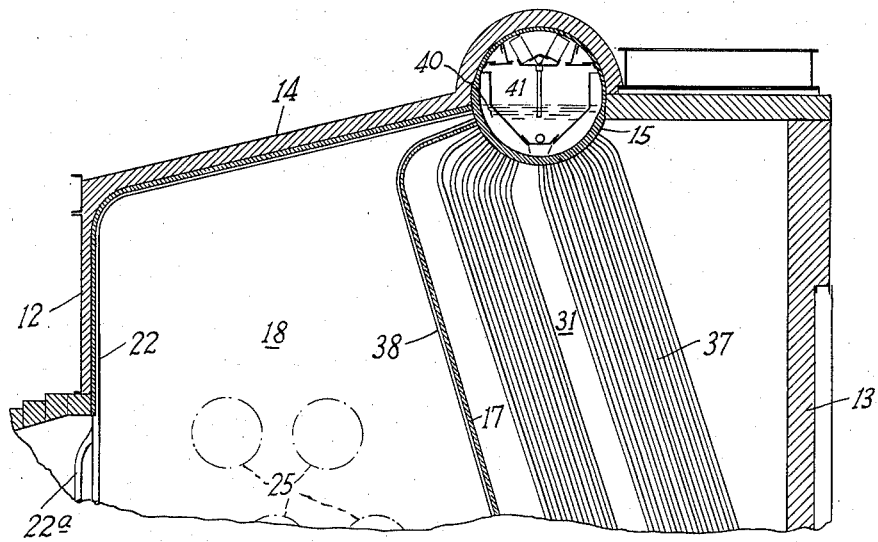
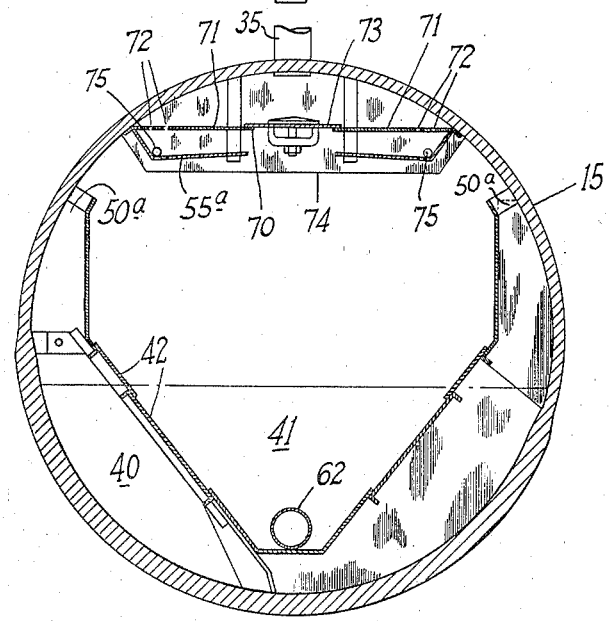
INVENTORS
Will H. Rowand and
Charles U. Savoye
ATTORNEY.

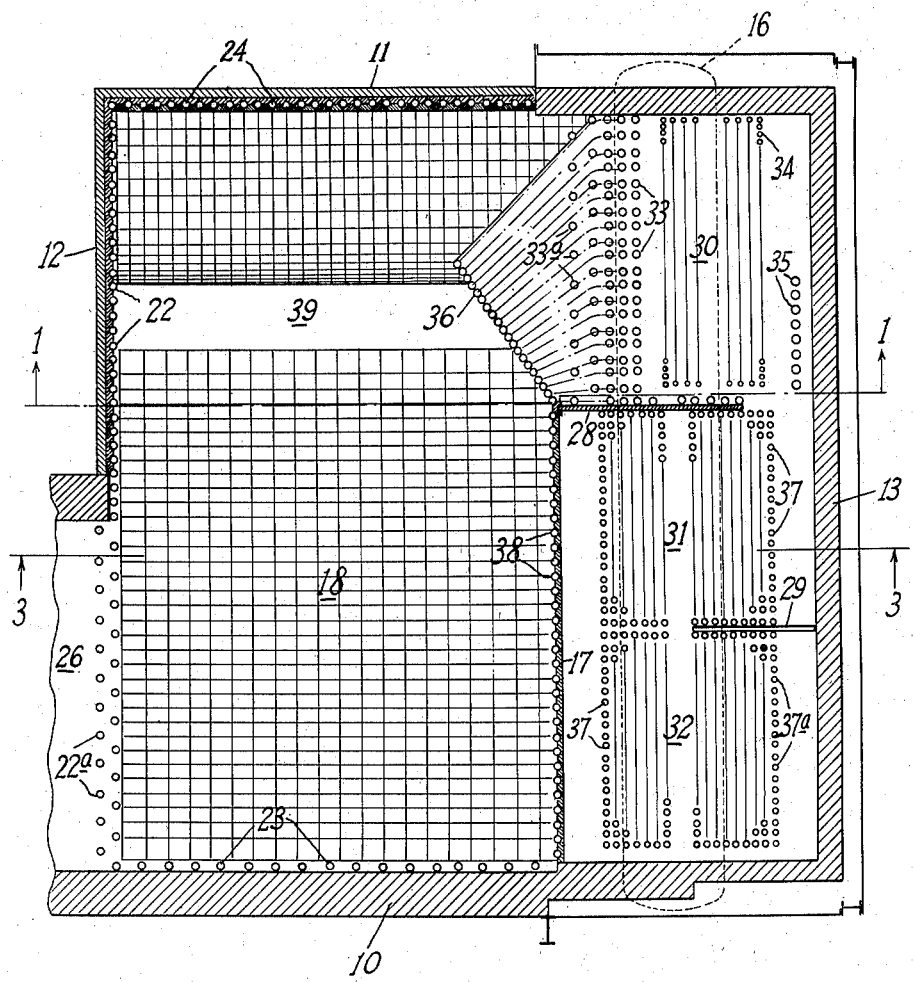

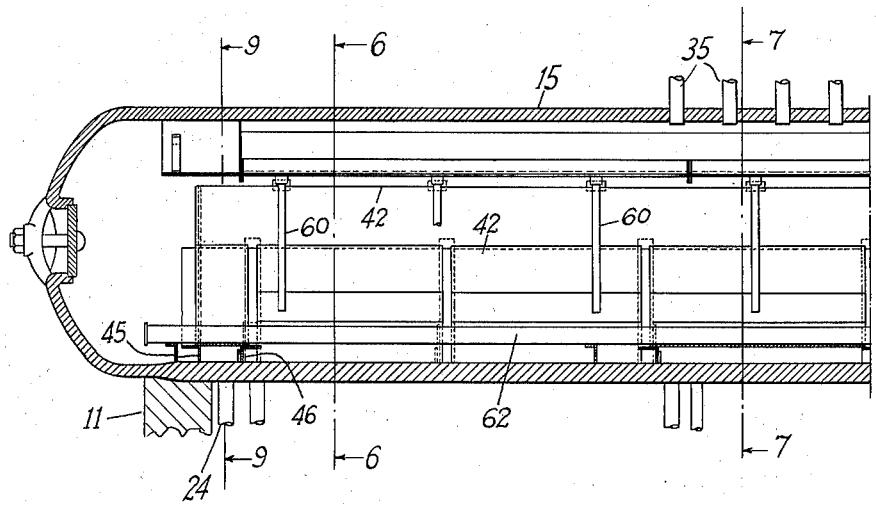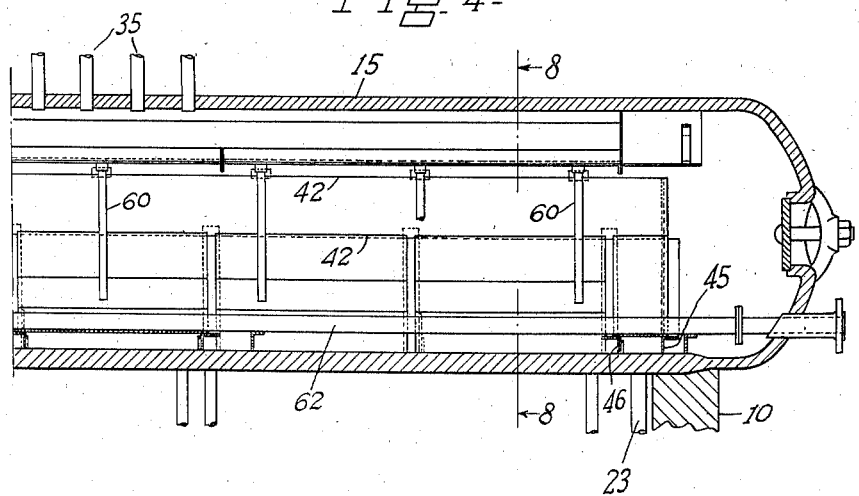

July 2, 1940.  W. H. ROWAND ET AL  2,206,336
STEAM BOILER
Filed Nov. 26, 1937   8 Sheets-Sheet 5

INVENTORS
Will H. Rowand and
Charles U. Savoye
BY
ATTORNEY.

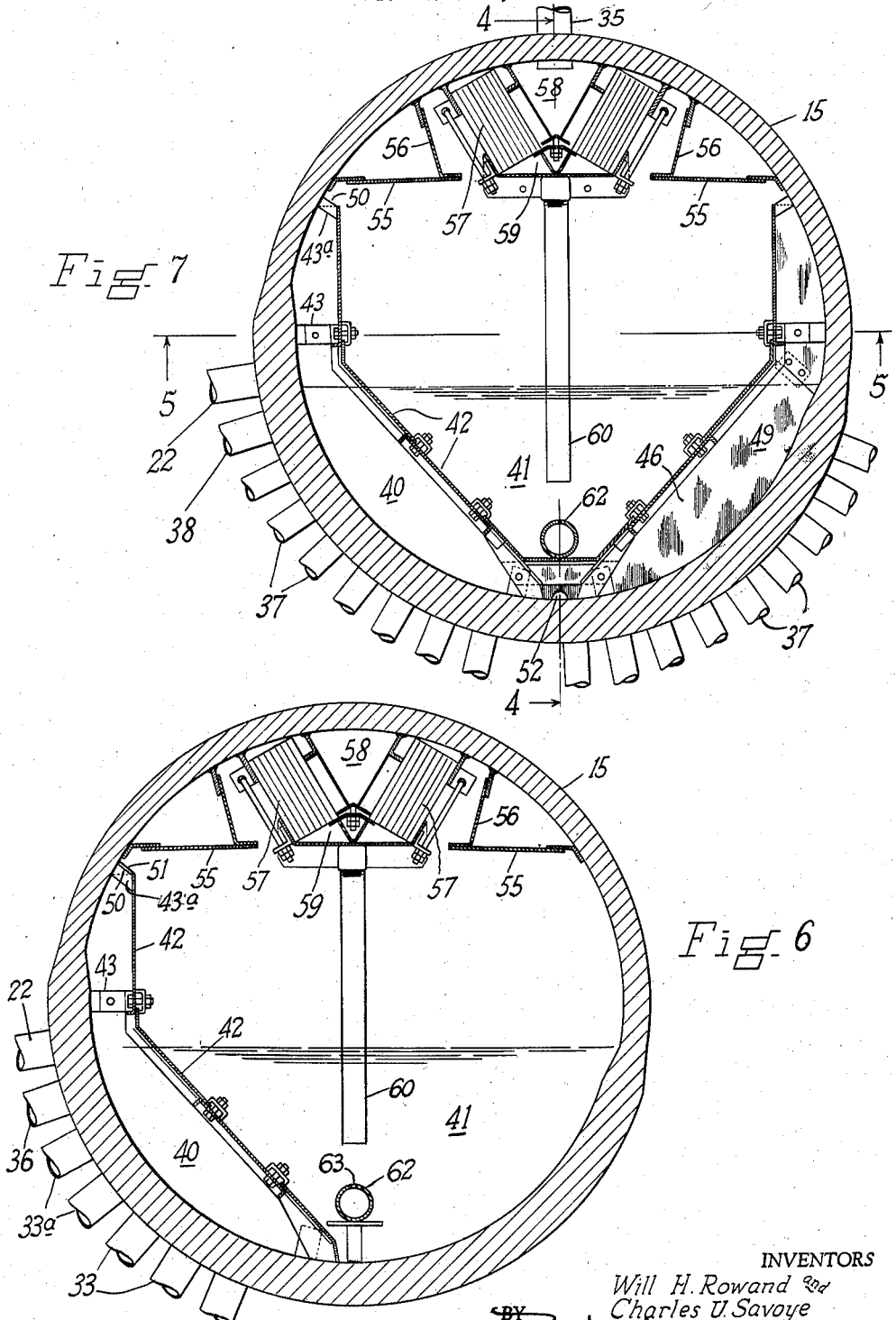

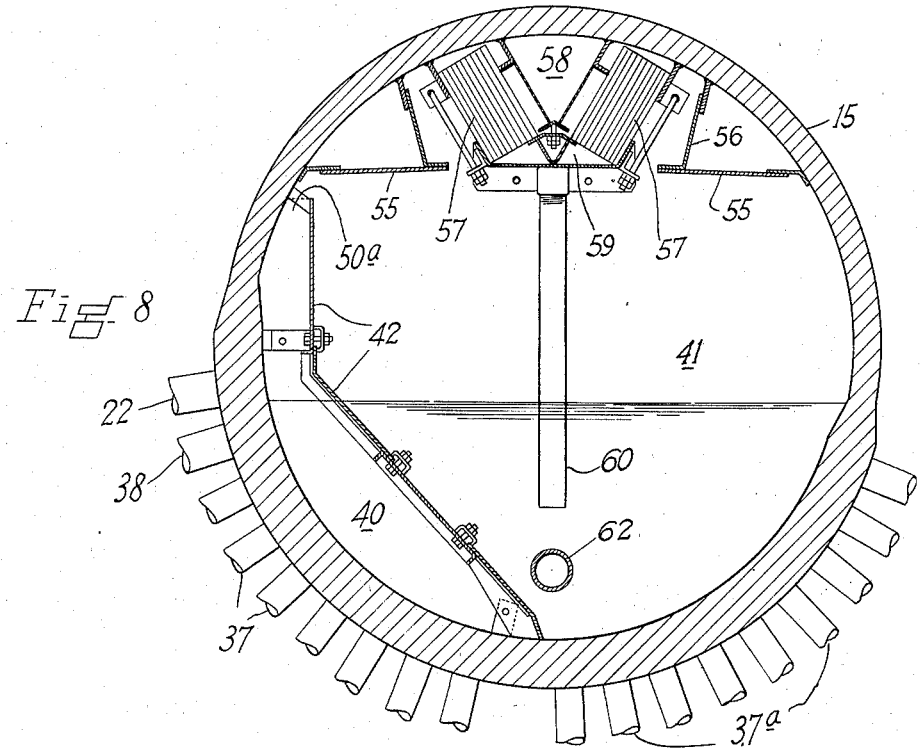
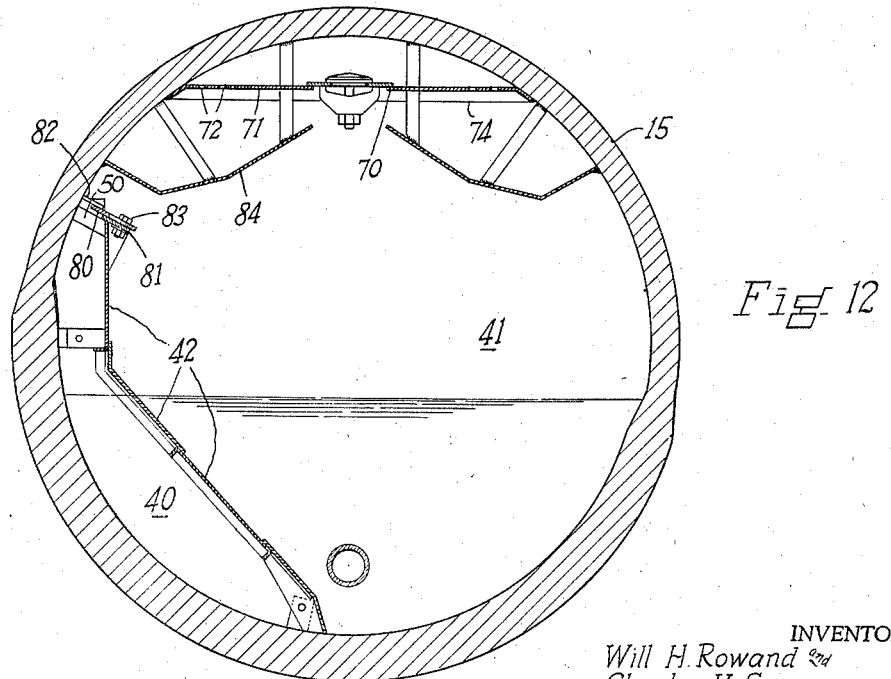

July 2, 1940.  W. H. ROWAND ET AL  2,206,336
STEAM BOILER
Filed Nov. 26, 1937  8 Sheets-Sheet 8

INVENTORS
Will H. Rowand and
Charles U. Savoye
BY
ATTORNEY.

Patented July 2, 1940

2,206,336

UNITED STATES PATENT OFFICE 2,206,336

STEAM BOILER

Will H. Rowand, Jersey City, and Charles U. Savoye, Hackensack, N. J., assignors to The Babcock & Wilcox Company, Newark, N. J., a corporation of New Jersey Application November 26, 1937, Serial No. 176,478

14 Claims. (Cl. 122—488)

The present invention relates in general to the construction and operation of vapor generating units, and more particularly, to water tube steam boilers of the general type disclosed in U. S. Patents No. 1,999,982 and 1,999,984.

The main object of the invention is the provision of a steam and water drum internal construction for steam boilers of the character described which permits the operation of such boilers at relatively high steaming capacities and/or high solid concentrations in the boiler water while delivering substantially dry steam.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of the invention.

Of the drawings:

Fig. 2 is a horizontal section taken on the line 2—2 of Fig. 1;

Fig. 3 is a partial vertical section taken on the line 3—3 of Fig. 2;

Figure 5:
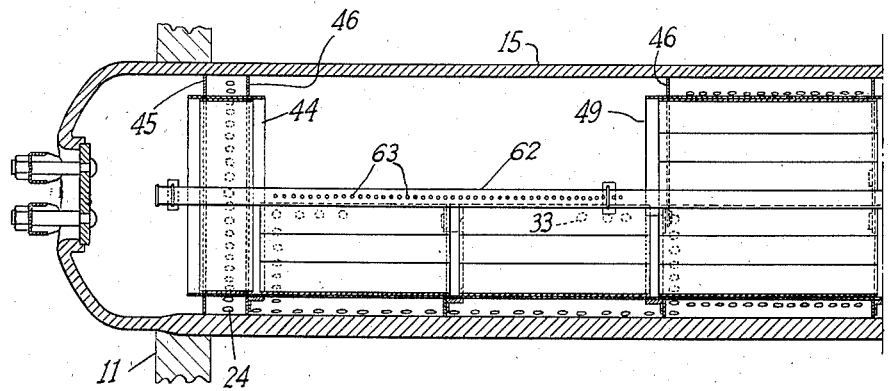
Figure 5A:
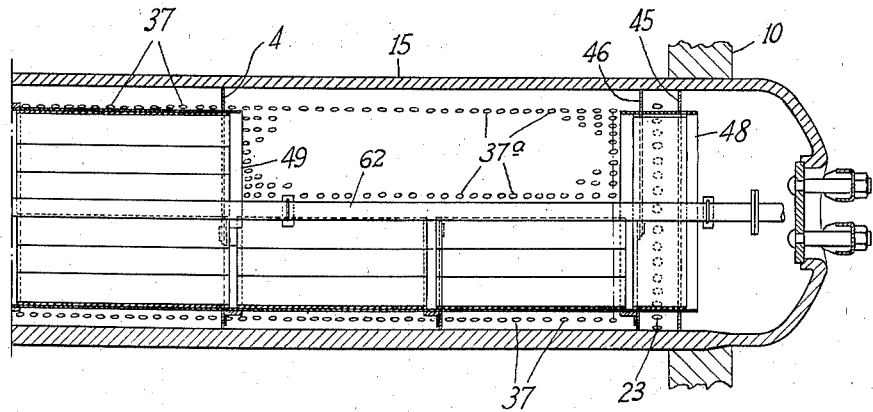
Figure 9:
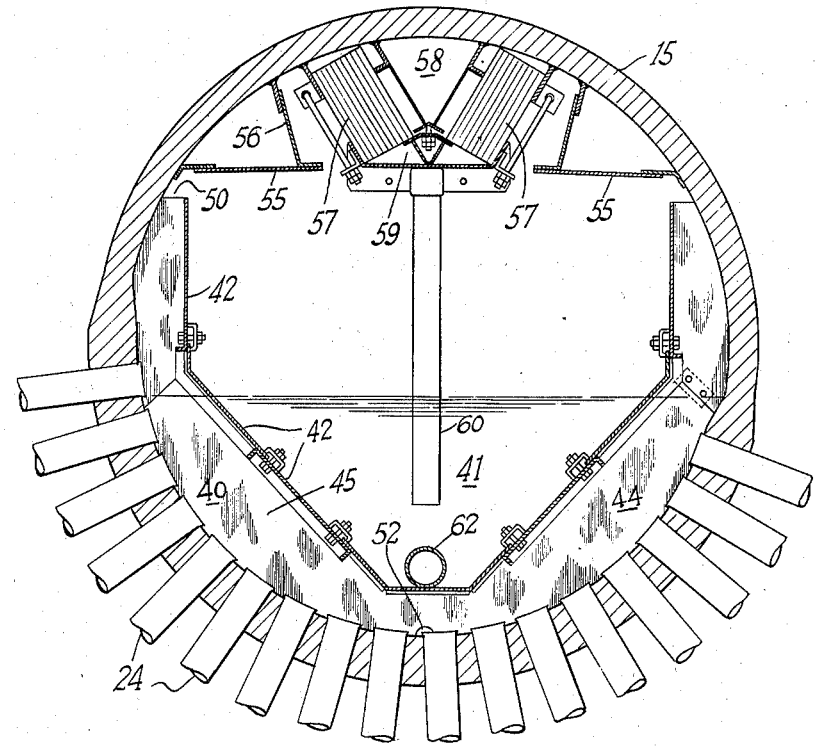
Figure 10:
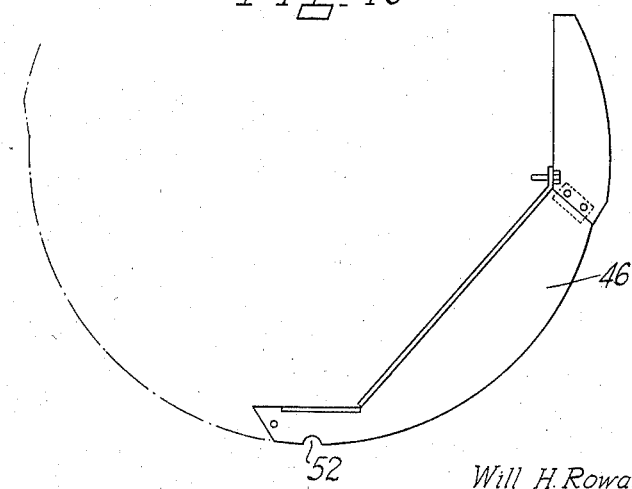

Figs. 4—4A are supplementary vertical sectional views taken longitudinally of the steam and water drum;

Figs. 5—5A are supplementary horizontal sectional views taken longitudinally of the steam and water drum;

Figs. 6 and 7 are transverse sections taken on the lines 6—6 and 7—7 of Fig. 4 respectively;

Fig. 8 is a transverse section taken on the line 8—8 of Fig. 4A;

Fig. 9 is a transverse section taken on the line 9—9 of Fig. 4;

Fig. 10 is an elevation of one of the compartment extension end plates;

Fig. 11 is a view similar to Fig. 7 illustrating a modified drum construction; and Fig. 12 is a view similar to Fig. 6 illustrating another modification.

Figure 1:
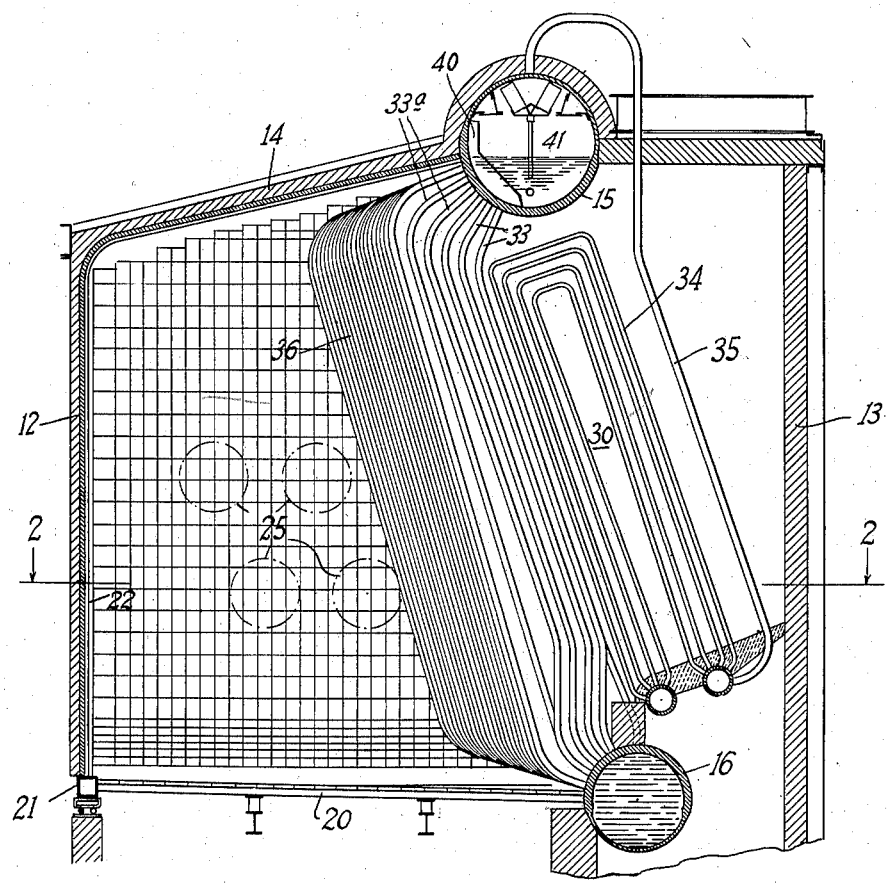
Fig. 1 is a vertical section taken on the line 1—1 of Fig. 2 of a two-drum integral furnace steam boiler unit incorporating the invention.

The steam boiler unit illustrated, particularly in Figs. 1 to 3, comprises a generally rectangular setting including vertical front and rear walls 10 and 11 respectively, and opposite vertical side walls 12 and 13. The top of the setting is closed by a roof 14. The pressure parts of the unit comprise a horizontally arranged upper steam and water drum 15 extending the full length of the setting, a substantially parallel lower water drum 16, and a bank of water tubes along one side of the setting connecting the drums as hereinafter described. The space occupied by the tube bank is separated for a major portion of its length from a fluid cooled furnace chamber 18 by a vertical partition 17. The furnace chamber 18 is fluid cooled by a row of block covered floor tubes 20 between the drum 16 and a lower side wall header 21. A row of water tubes 22 extends from the header 21 upwardly along the wall 12 and across the roof 14 to the drum 15, being connected thereto slightly below the horizontal center line in a longitudinal row. The front wall 10 is protected with a row of bare water tubes 23 having their lower ends connected to the drum 16 and their upper ends to the drum 15 in a circumferential row extending over the drum bottom at opposite sides of the vertical center line of the drum. The rear wall is provided with a row of block covered water tubes 24 connected to the drums 15 and 16 similarly to the front wall tubes 23.

The furnace chamber 18 may be heated either by fluid fuel burners 25 mounted in the front wall 10, or by heating gases from an auxiliary furnace 26 at one side thereof, or both. The lower portions of alternate side wall tubes 22 are preferably bent, as indicated at 22ᵃ, to form a water tube screen across the connection of the auxiliary furnace to the furnace chamber 18.

Vertical partitions 28 and 29 divide the tube bank space into three serially connected gas passes 30, 31, and 32, extending transversely of the tube bank, the first gas pass 30 opening to the rear end of the furnace chamber 18, and the third pass 32 to a suitable gas exit. The gas pass 30 is occupied by tubes 33 forming the rear portion of the main tube bank, the tubes 33ᵃ in the inner rows being arranged to form a slag screen. At the outer side of the tubes 33 is a steam superheater formed by inverted U-shaped tubes 34 connected to the second pass section of the drum 15 by steam outlet tubes 35. Some of the tubes in this section of the bank are bent inwardly and closely spaced to form a wing wall 36 at the rear end of the partition 17. The tubes 22, 33, 33ᵃ, and 36 open to the drum 15 at one side of its vertical center line, as shown in Figs. 1 and 6. The second and third gas passes 31 and 32 are occupied by the remaining portion of the tube bank which is formed by tubes 37, of smaller diameter than the tubes 33, opening to the drum 15 at opposite sides of its vertical center line, as shown in Figs. 3 and 7. The partition 17 is fluid cooled by a row of partly studded tubes 38 spaced from and of larger diameter than the tubes 37. The tubes 37a in the outer portion of the third pass 32 being contacted with the lowest temperature gases normally serve as downcomers, while the remaining tubes connected to the drum 15 normally are riser tubes.

With the described boiler construction, the heating gases pass rearwardly in the furnace chamber 18 around the rear end of the wing wall 36 and into the first gas pass 30, successively contacting with the tubes 33a, 33, and superheater tubes 34 therein. The gases then flow around the outer end of the baffle 28 into the second gas pass 31 contacting with the tubes 37 therein, then around the inner end of the baffle 29 into the third pass 32 and across the tubes 37 therein before passing out of the setting. Any ash depositing in the furnace chamber 18 is removed through an ash pit 39. The furnace wall tubes 22, 23, and 24, partition tubes 38, wing wall tubes 36, and the tubes 33a, will receive a substantial amount of heat by radiation from the furnace chamber 18, while the tubes 33a, 33, 34, and 37 are heated by convection by the heating gases. The tubes 33a are considered to have the greatest rate of heat absorption, but the furnace wall tubes 22, 23, and 24, partition tubes 38, and wing wall tubes 36 also have a high rate of heat absorption.

In steam boilers of the character described, the steam and water drum 15 will thus ordinarily receive steam generated from submerged generating tubes opening thereto substantially throughout its length, which contributes to disturbed water levels in the drum. Due to the connection of most of the high duty tubes to the first pass section of the drum, the mean water level in that portion tends to be higher than in the portion above the second and third passes. These conditions which include locally high actual water levels at disturbed surfaces tend to limit the capacity at which the boiler can be operated and yet obtain steam of the desired quality. With an increase in steaming capacity, the rate of circulation correspondingly increases, resulting in increased disturbance of the water in the drum 15 and possibly insufficient capacity of the tubes serving as downcomers. The concentration of solids maintained in the boiler water has substantially increased in recent years, and operation with concentrations approaching 5,000 parts per million is now considered desirable. High solid concentrations tend to cause substantial foaming in the steam and water drum which raises the actual water level locally or generally. Boilers of the character described are also used with widely fluctuating load conditions, and any rapid increase in load tends to cause a corresponding rise in the steam-water ratio in the boiler and this also tends to raise the actual water level. All of the above conditions result in higher actual water levels in the drum 15 and increased probability of carrying water out with the steam to an extensive degree or otherwise limit the boiler capacity for an allowable moisture content.

In accordance with our invention, conditions in the steam and water drum are materially improved by the provision of internal parts which not only substantially reduce water disturbance and foaming in the drum, but also provide lower water levels, more effective separation of the moisture from the steam, deaeration of the feed water, and improved circulation. Substantially all of the steam generated is delivered to a chamber or compartment in the drum separated from the remaining portion of the drum in which separation of the steam and moisture mainly occurs and to which the downcomer tubes are connected. The entering fluid is discharged from this compartment at a level in the drum substantially above the water level in the remaining portion of the drum through one or more restricted discharge openings of variable flow area to control the steam-water ratio of the mixture discharged therein from the generating tubes. The steam is discharged from the compartment along substantially the entire length of the drum and caused to flow horizontally across the drum at a relatively low velocity through a moisture separating space and is further subjected to a mechanical moisture separating action before leaving the drum. The feed water is supplied to the drum in such a manner that it readily mixes with the saturated water and is caused to flow along the drum for a substantial distance before reaching the downcomer tubes, whereby completion of the deaeration of the feed water is insured and elimination of steam bubbles promoted.

As shown in Figs. 4 to 10, the steam and water drum 15 is divided for substantially its entire length into two laterally adjacent compartments 40 and 41, the compartment 40 occupying the circumferential portion of the drum above the riser tubes, while the compartment 41 is formed by the remaining portion of the drum. In the portion of the drum above the first pass, as shown in Fig. 6, the compartment 40 extends along only the furnace side of the drum, being formed by the drum wall and an inner wall formed by a series of detachably connected plates 42 extending from the bottom of the drum to a point substantially above the normal water level in the compartment 41. The plates 42 are held in position by braces 43 and clips 43a secured to the drum wall. The rear end of the compartment 40 is enlarged circumferentially of the drum to form a compartment extension 44 over the upper ends of the connections of the rear wall tubes 24. The rear end of the compartment 40 and of this extension is closed by a V-shaped end plate 45, as shown in Fig. 9, while the front end of the extension is closed by a plate 46, shown in Fig. 10. The inner wall of the extension is closed by a plate arrangement similar to the plates 42. A similar extension 48 is used at the front end of the drum for confining the discharge of the front wall tubes 23 to the compartment 40, except that the plates 45 and 46 are oppositely arranged. A substantially similar compartment extension 49 is used throughout the portion of the drum above the second gas pass 31, as shown in Fig. 7. With this construction the compartment 40 will have a V-formation in vertical cross-section above the drum connections of the front and rear wall tubes and the tubes connected to the portion of the drum above the second pass, and a half V-formation in the drum portions above the tubes in the first and third gas passes.

The compartment 40 is so proportioned that the major portion of its volume is below the normal water level in the drum and in the area of the tube connections thereto. The portions of the compartment above the water line and tube connections are gradually restricted due to the vertical arrangement of its inner wall and curvature of the drum wall, to provide an outlet slot 50 of restricted flow area therebetween at its upper end. The effective discharge area of the slot 50 can be decreased as desired to build up the pressure in the compartment 40 and thereby increase the throttling effect on the riser tubes. Any increase in the static pressure in the compartment 40 will result in an increase in the ratio of steam-water of the mixture discharged by the riser tubes into the compartment. This can be readily done by closing the slot 50 at spaced points by plates 51, as indicated in Fig. 6. The described throttling action on the riser tubes lessens the amount of water circulated through the drum 15 and lowers the water level in the compartment 41. As shown, the compartment end and division plates 45 and 46 are formed with openings 52 in their lowermost portions permitting an equalizing flow of water longitudinally of the drum.

The drum compartment 41 constitutes the main steam and water separating space of the drum. The steam flow in this compartment above the water level therein is controlled by a pair of substantially horizontal baffle plates 55 secured to the drum wall slightly above corresponding discharge slots 50 and extending inwardly of the drum a substantial distance beyond the corresponding discharge slots. With this arrangement the wet steam discharged through the slots will impact on the drum wall and baffles 55 which causes its kinetic energy to be largely dissipated, and the steam to flow horizontally at a decreased velocity towards the center line of the drum throughout substantially its entire length. Due to the low water level and quiescent surface conditions in the water space of the compartment 41 a space of substantial volume is provided for the separation of moisture from the steam, which effect is aided by the horizontal flow of the steam. The space between the inner end of the baffles 55 and the superjacent wall portions is closed by plates 56. The space between the inner ends of the baffles 55 and above the level of the same is occupied by a steam and water separator of the type shown in U. S. Patent #2,007,966, comprising a pair of oppositely inclined corrugated plate separator sections 57, between the moisture separating plates of which the steam is required to pass before reaching an inner chamber 58, to which the steam outlet tubes 35 are connected. The lower ends of the separator sections drain into a drain chamber 59 to which drain pipes 60 open at spaced points. The lower ends of the pipes 60 are submerged in the water space of the compartment 41, and return the separator drainage to the water pool. The arrangement of the baffles 55 thus also forces the steam to make an abrupt turn around the inner end of the baffle before entering the separator sections.

Feed water is supplied to the steam and water drum through a pipe 62 entering the front head of the drum and extending substantially the entire length. The rear end of the feed pipe is closed and the feed water discharged through a row of openings 63 in the upper side of the pipe, the pipe openings being confined to the portion of the pipe above the first pass of the boiler. The feed water on being discharged mixes with the water in the water space of the compartment 41, and flows longitudinally therein to the downcomer tubes 37ª in the third pass.

In lieu of using a steam and water separator of the character described, the compartment 41 may have a dry pan construction as shown in Figs. 11 or 12. In Fig. 11, a dry pan 70 extends between the drum walls across the upper end of the drum, being formed by horizontal side plates 71 having perforations 72, and a center plate 73 which is unperforated. In this form of the invention the upper end of the compartment inner wall is bent substantially parallel to the drum wall providing a correspondingly directed discharge slot 50ª. The discharge from each slot 50ª is received by the drum wall and an impact baffle 55ª arranged below the dry pan plate 71, whereby the steam is forced to make a 180° turn before entering the perforations in the dry pan. As shown in Fig. 11, the inner ends of the baffles 55ª are slightly tilted to cause the baffles to drain toward the drum walls. The ends of the dry pan and baffle spaces are closed by end plates 74 having openings 75 therein for the discharge of drainage from the baffles 55ª.

In the construction shown in Fig. 12, the effective discharge area of each compartment discharge slot 50 is controlled by adjustable plates 80 adapted to be projected across the slot. Each plate 80 is adjustably mounted on a supporting plate 81 carried on the compartment inner wall 42. Each of the plates 80 carries one or more projecting studs 82 on its upper side for maintaining the spacing of the plate from the drum wall. The studs 82 are cut down in length when it is desired to move the corresponding plate 80 so as to further obstruct the corresponding discharge slot. Bolts 83 hold the plates 80 in position. A somewhat different form of impact baffle 84 may be used with this formation of the discharge slot, as shown.

While in accordance with the provisions of the statutes we have illustrated and described herein the best forms of the invention now known to us, those skilled in the art will understand that changes may be made in the form of the apparatus disclosed without departing from the spirit of the invention covered by our claims, and that certain features of the invention may sometimes be used to advantage without a corresponding use of other features.

We claim:

1. A vapor generator having a horizontally elongated liquid and vapor drum, a group of vertically disposed vapor generating tubes having a submerged connection directly with the lower portion of said drum, and means cooperating with the side wall of said drum to form a circumferentially extending compartment occupying only a small portion of the cross-sectional area of said drum and enclosing the discharge ends of said tubes, said compartment having an imperforate inner side adjacent the discharge ends of said tubes and one or more upwardly directed discharge passages of substantially restricted flow area at its upper end alongside said side wall and substantially above the normal liquid level in said drum.

2. A vapor generator having a horizontally elongated liquid and vapor drum, a group of vertically disposed vapor generating tubes having a submerged connection directly with the lower portion of said drum, means cooperating with the side wall of said drum to form a circumferentially extending compartment within said drum enclosing the discharge ends of said tubes, said compartment having a substantially imperforate inner side and one or more upwardly directed discharge passages of substantially restricted flow area at its upper end adjacent said side wall and above the normal liquid level in said drum, a baffle spaced from and arranged to receive the impact of the fluid discharged from each of said discharge passages and deflect the same across said drum, and a vapor outlet in the upper part of said drum.

3. A vapor generator having a horizontally elongated liquid and vapor drum, a group of vertically disposed vapor generating tubes having a submerged connection directly with the lower portion of said drum, means cooperating with the side wall of said drum to form a circumferentially extending compartment within said drum enclosing the discharge ends of said tubes, said compartment having a substantially imperforate inner side and one or more upwardly directed discharge passages of substantially restricted flow area at its upper end adjacent said side wall and substantially above the normal liquid level in said drum, a baffle spaced from and arranged to receive the impact of the fluid discharged from each of said discharge passages and deflect the same across said drum, a vapor outlet in the upper part of said drum, liquid and vapor separating means in the upper part of said drum in the vapor flow path between said baffle and outlet, and downflow tubes connected to the portion of said drum beyond said compartment.

4. A steam boiler having a horizontally elongated steam and water drum, a group of vertically disposed steam generating tubes having a submerged connection directly with the lower portion of said drum, means cooperating with the side wall of said drum to form a circumferentially extending compartment within said drum enclosing the discharge ends of said tubes, said compartment occupying only a small portion of the cross-sectional area of and having one or more upwardly directed discharge passages of substantially restricted flow area at its upper end adjacent said side wall and above the normal water level in said drum, a baffle spaced from and arranged to receive the impact of the steam discharged from each of said passages and deflect the same across said drum, a steam outlet in the upper part of said drum, and steam and water separating means in the upper part of said drum in the steam flow path between said baffle and outlet.

5. A steam boiler having a horizontally elongated steam and water drum, a bank of vertically disposed water tubes having a submerged connection directly with the lower portion of said drum along the length thereof, means cooperating with the side wall of said drum to form a compartment extending circumferentially within said drum and enclosing the discharge ends of substantially all of the tubes in said tube bank normally having an upflow therein, said compartment occupying only a small portion of the cross-sectional area of and having one or more upwardly directed discharge passages of substantially restricted flow area at its upper end along said side wall and above the normal water level in said drum, a baffle arranged to receive the impact of the fluid discharged from each of said discharge passages and deflect the same horizontally across said drum, and a steam outlet in the upper part of said drum.

6. A steam boiler having a horizontally elongated steam and water drum, a bank of vertically disposed water tubes having a submerged connection directly with the lower portion of said drum along the length thereof, means cooperating with the side wall of said drum to form a compartment extending circumferentially within said drum and enclosing substantially all of the tubes in said tube bank normally having an upflow therein, said compartment having an imperforate inner side and one or more upwardly directed discharge passages of substantially restricted flow area at its upper end adjacent said side wall and above the normal water level in said drum, a baffle spaced from and arranged to receive the impact of the fluid discharged from each of said passages and deflect the same horizontally across said drum, a steam outlet in the upper part of said drum beyond said compartment, steam and water separating means in the upper part of said drum in the steam flow path between said baffle and outlet, and downflow tubes in said tube bank connected to the portion of said drum beyond said compartment.

7. A steam boiler having an upper horizontally elongated steam and water drum, a row of vertically disposed water tubes connected to the lower portion of said drum at opposite sides of its center line, means cooperating with the side wall of said drum to form a compartment of U-shaped cross-section extending circumferentially within said drum and enclosing the discharge ends of said tubes, said compartment having a plurality of upwardly directed discharge passages of substantially restricted flow area at opposite sides of said drum and above the normal water level in said drum, baffles arranged to receive the impact of the fluid discharged from said passages and deflect the same across said drum, a steam outlet in the upper part of said drum, and steam and water separating means between said baffles and in the steam flow path between said baffles and outlet.

8. A steam boiler having a setting including vertical front and rear walls, a horizontally elongated steam and water drum, a bank of vertically disposed water tubes connected to the lower portion of said drum along the length thereof, means cooperating with the side wall of said drum to form a circumferentially extending compartment within said drum enclosing substantially all of the tubes in said tube bank normally having an upflow therein, said compartment occupying only a small portion of the cross-sectional area of and having one or more upwardly directed discharge passages of substantially restricted flow area at its upper end adjacent said drum side wall and substantially above the normal water level in said drum, means for varying the effective flow area of said passages, and downflow tubes in said tube bank connected to the portion of said drum beyond said compartment.

9. A steam boiler having a setting including vertical front and rear walls, a horizontally elongated steam and water drum, a bank of water tubes connected to the lower portion of said drum along the length thereof, a partition separating the space containing said tube bank and a laterally adjoining furnace chamber communicating with the rear end thereof, water tubes arranged to cool said partition, means cooperating with the side wall of said drum to form a circumferentially extending compartment within said drum enclosing substantially all of the tubes in said tube bank normally having an upflow therein and said partition tubes, said compartment having one or more upwardly directed discharge passages of substantially restricted flow area at its upper end adjacent said drum side wall and above the normal water level in said drum, a baffle spaced from and arranged to receive the impact of and deflect the fluid discharged from each of said passages across said drum, and a steam outlet in the upper part of said drum.

10. A steam boiler having a setting including vertical front, rear and side walls, a horizontally elongated steam and water drum, a bank of water tubes connected to the lower portion of said drum along the length thereof at one side of said setting and receiving heating gases from a laterally adjoining furnace chamber, a row of water tubes extending along the front and rear walls of said furnace chamber and connected to the lower part of said drum, means cooperating with the side wall of said drum to form a circumferentially extending compartment within said drum enclosing substantially all of the tubes in said tube bank normally having an upflow therein and said front and rear wall tube connections, said compartment having one or more discharge passages of substantially restricted flow area at opposite sides of and above the normal water level in said drum, and downflow tubes in said tube bank connected to the portion of said drum beyond said compartment.

11. A steam boiler having a horizontally elongated steam and water drum, a bank of water tubes connected to the lower portion of said drum along the length thereof, a furnace chamber communicating with one end of the space containing said tube bank, means providing a heating gas flow longitudinally of said tube bank, means cooperating with the side wall of said drum to form a circumferentially extending compartment within said drum enclosing substantially all of the tubes in said tube bank normally having an upflow therein, said compartment having one or more discharge passages of restricted flow area at its upper end substantially above the normal water level in said drum, a steam outlet in the upper part of said drum beyond said compartment, means for supplying feed water to the portion of said drum beyond said compartment at the tube bank end receiving the heating gases from said furnace chamber, and downflow tubes in said tube bank connected to the opposite end portion of said drum beyond said compartment.

12. A steam boiler having a setting including vertical front and rear walls, an upper horizontally elongated steam and water drum, a bank of water tubes connected to the lower portion of said drum along the length thereof, a partition separating the space containing said tube bank and a laterally adjoining furnace chamber communicating with the rear end thereof, baffle means arranged to divide said tube bank space into a plurality of serially connected gas passes extending transversely of said tube bank, means cooperating with the side wall of said drum to form a compartment within said drum of varying circumferential extent and enclosing substantially all of the tubes in said tube bank normally having an upflow therein, said compartment having one or more discharge passages of substantially restricted flow area at its upper end adjacent said drum side wall and above the normal water level in said drum, a steam outlet in the upper part of said drum beyond said compartment, and downflow tubes in said tube bank connected to the front portion of said drum circumferentially beyond said compartment.

13. A steam boiler having a setting including vertical front, rear and side walls, an upper horizontally elongated steam and water drum, a bank of water tubes connected to the lower portion of said drum along the length thereof, a partition separating the space containing said tube bank and a laterally adjoining furnace chamber communicating with the rear end thereof, baffle means arranged to divide said tube bank space into a plurality of serially connected gas passes extending transversely of said tube bank, means cooperating with the side wall of said drum to form a compartment within said drum of varying circumferential extent and enclosing substantially all of the tubes in said tube bank normally having an upflow therein, said compartment having one or more discharge passages of substantially restricted flow area at its upper end adjacent said drum side wall and above the normal water level in said drum, a baffle arranged to receive the impact of the fluid discharged from each of said passages and deflect the same across said drum, a steam outlet in the upper part of said drum, steam and water separating means in the upper part of said drum in the steam flow path between said baffle and outlet, and downflow tubes in said tube bank connected to the front portion of said drum circumferentially beyond said compartment.

14. A steam boiler having a setting including vertical front, rear and side walls, an upper horizontally elongated steam and water drum, a bank of water tubes connected to the lower portion of said drum along the length thereof, a partition separating the space containing said tube bank and a laterally adjoining furnace chamber communicating with the rear end thereof, baffle means arranged to divide said tube bank space into a plurality of serially connected gas passes extending transversely of said tube bank, water tubes extending along the front, rear and side walls of said furnace chamber and connected to the lower part of said drum, means cooperating with the side wall of said drum to form a compartment within said drum of varying circumferential extent and enclosing the drum connections of substantially all of the tubes in said tube bank normally having an upflow therein and said front, rear and side wall tube drum connections, the downflow tubes in said tube bank being connected to the front portion of said drum circumferentially beyond said compartment, said compartment having one or more discharge passages of substantially restricted flow area at its upper end along said drum side wall and above the normal water level in said drum beyond said compartment, a baffle arranged to receive the impact of the fluid discharged from each of said passages and deflect the same horizontally across said drum, a steam outlet in the upper part of said drum, steam and water separating means in the upper part of said drum in the steam flow path between said baffle and outlet, and means for supplying feed water to the rear portion of said drum beyond said compartment.

WILL H. ROWAND.
CHARLES U. SAVOYE.